(12) United States Patent
Riefe et al.

(10) Patent No.: US 8,162,111 B2
(45) Date of Patent: Apr. 24, 2012

(54) BRAKE CALIPER WITH REDUCED BRAKE SQUEAL

(75) Inventors: Mark T. Riefe, Brighton, MI (US);
Brent D. Lowe, Milford, MI (US);
David B. Antanaitis, Northville, MI (US); Patrick J. Monsere, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 578 days.

(21) Appl. No.: 12/333,362

(22) Filed: Dec. 12, 2008

(65) Prior Publication Data

US 2010/0147634 A1 Jun. 17, 2010

(51) Int. Cl.
*F16D 55/22* (2006.01)
(52) U.S. Cl. ............ 188/73.37; 188/72.4; 188/370
(58) Field of Classification Search ............ 188/72.1, 188/72.4, 73.37, 105, 106 P, 151 R, 152, 188/361, 368, 369, 370
See application file for complete search history.

(56) References Cited

U.S. PATENT DOCUMENTS

| | | | | |
|---|---|---|---|---|
| 2,799,367 A * | 7/1957 | Dotto | ............................. | 188/72.5 |
| 3,420,342 A * | 1/1969 | Botterill | ...................... | 188/264 F |
| 3,487,896 A | 1/1970 | Becker et al. | | |
| 3,882,972 A * | 5/1975 | Newstead et al. | ............ | 188/72.5 |
| 4,799,575 A * | 1/1989 | Kroniger | ...................... | 188/71.6 |
| 5,515,948 A * | 5/1996 | Gilliland | ...................... | 188/72.5 |
| 6,092,631 A * | 7/2000 | Matsuzaki et al. | ........... | 188/72.5 |
| 7,021,727 B2 | 4/2006 | Kamiya et al. | | |

FOREIGN PATENT DOCUMENTS

| | | |
|---|---|---|
| DE | 3640056 | 6/1988 |
| DE | 4301684 | 8/1994 |
| DE | 19925005 | 12/2000 |
| JP | 58057527 A * | 4/1983 |
| JP | 04083928 | 3/1992 |
| JP | 05288228 A * | 11/1993 |

OTHER PUBLICATIONS

Disc brake, Wikipedia, the free encyclopedia, Jul. 31, 2008, p. 1-7, http://en.wikipedia.org/wiki/Brake_caliper.
Proportioning valve, Wikipedia, the free encyclopedia, Sep. 25, 2008, p. 1, http://en.wikipedia.org/wiki/Proportioning$_{13}$ valve.
Check valve, Wikipedia, the free encyclopedia, Sep. 25, 2008, p. 1-3, http://en.wikipedia.org/wiki/Check_valve.
Exploded view of front brake caliper-Cobra model, Sep. 22, 2008, p. 1, http://mjbobbitt.home.comcast.net/~mjbobbit/mustang/calipers/cobra_caliper_diagram.jpg.

* cited by examiner

*Primary Examiner* — Thomas J Williams
(74) *Attorney, Agent, or Firm* — BrooksGroup

(57) ABSTRACT

An exemplary embodiment of a brake caliper has a housing with a first chamber and a second chamber. The brake caliper also has a first piston that moves in response to fluid pressure in the first chamber and has a second piston that moves in response to fluid pressure in the second chamber. A brake pad has a leading end portion that is acted upon by the first piston and has a trailing end portion that is acted upon by the second piston. A fluid passage leads to the first chamber. The trailing end portion contacts an associated rotor before the leading end portion contacts the rotor.

16 Claims, 2 Drawing Sheets

BRAKE CALIPER WITH REDUCED BRAKE SQUEAL

TECHNICAL FIELD

The technical field generally relates to brake calipers and ways to reduce or eliminate brake squeal caused when a brake pad contacts a rotor.

BACKGROUND

An automotive disc brake has a brake caliper that forces one or more brake pads against a rotor to slow or stop an automobile. Sometimes contact between the brake pads and the rotor generates brake squeal, and sometimes the brake pads are worn unevenly over time. One example effect is a so-called spragging where a leading end portion of the brake pad contacts the rotor before a trailing end portion does, and the disc brake may consequently squeal and wear unevenly.

SUMMARY OF EXEMPLARY EMBODIMENTS OF THE INVENTION

One exemplary embodiment includes a product which may include a brake caliper, a fluid passage, and a valve. The brake caliper may have a housing with a first chamber and a second chamber. The brake caliper may also have a first piston moving in response to fluid pressure in the first chamber, and may have a second piston moving in response to fluid pressure in the second chamber. The brake caliper may also have a brake pad with a leading end portion acted upon by the first piston and with a trailing end portion acted upon by the second piston. The fluid passage may lead to the first chamber. The valve may be located in the fluid passage and may regulate fluid-flow to the first chamber so that the trailing end portion contacts an associated rotor before the leading end portion contacts the rotor.

Another exemplary embodiment includes a product which may include a brake caliper and a fluid passage. The brake caliper may have a housing with a first chamber, a second chamber, and a fluid inlet leading to the second chamber. The brake caliper may also have a first piston moving in response to fluid pressure in the first chamber and may have a second piston moving in response to fluid pressure in the second chamber. The brake caliper may further have a brake pad with a leading end portion acted upon by the first piston and with a trailing end portion acted upon by the second piston. The fluid passage may extend between the first and second chambers. When the brake caliper is activated, fluid-flow may flow through the fluid inlet, into the second chamber, into through the fluid passage, and into the first chamber. The trailing end portion may contact an associated rotor before the leading end portion contacts the rotor.

Another exemplary embodiment includes a method which may include providing a brake caliper having a housing with a first chamber and a second chamber. The brake caliper may have a first piston moving in response to fluid pressure in the first chamber, and may have a second piston moving in response to fluid pressure in the second chamber. The brake caliper may also have a brake pad with a leading end portion acted upon by the first piston and with a trailing end portion acted upon by the second piston. The method may also include pressurizing the first and second chambers. And the method may include regulating pressure to the first chamber so that the trailing end portion contacts an associated rotor before the leading end portion contacts the rotor.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

The figures illustrate exemplary embodiments of a brake caliper 10 designed to reduce or altogether eliminate brake squeal and other noises and vibrations caused when a brake pad 12 contacts an associated rotor 14. The brake caliper 10 may also, among other things, promote even wear on the brake pad 12 as the brake pad is used over time. Although the brake caliper 10 is shown and described with a set of dual-chambers and pistons straddling the rotor 14 on each side, the brake caliper may have other configurations and arrangements including, but not limited to, a single set of dual-chambers and pistons on only one side of the rotor, more than two chambers and pistons on a side of the rotor including three or four chambers and pistons, a floating type caliper, or a fixed type caliper.

Figure 1:
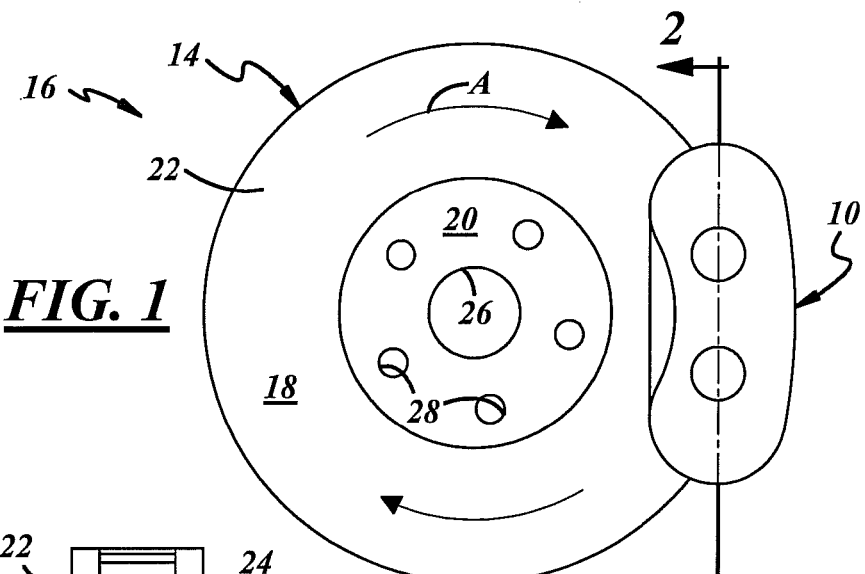
FIG. 1 is a side view of an exemplary embodiment of a disc brake.

Referring to FIG. 1, the rotor 14 is a component of a disc brake 16 used to slow or stop an automobile. The disc brake 16 may be equipped to front and/or rear vehicle wheels, and may have more, less, and/or different components than those shown and described. The rotor 14 may be of the vented-type, may be of the solid-type, or may be another type. The rotor 14 may include a cheek portion 18 and a hub portion 20. The cheek portion 18 may include a first cheek face 22 and an opposite second cheek face 24 that together constitute braking surfaces of the rotor 14 that contact the brake pad 12 during a braking event. The hub portion 20 may be used to mount the rotor 14 to the automobile, and may have a central aperture 26 and a number of bolt holes 28. In use, the rotor 14 rotates in a direction A. In select embodiments, the disc brake 16 may also include the brake caliper 10, a fluid passage 30, and a valve 32.

Figure 2:
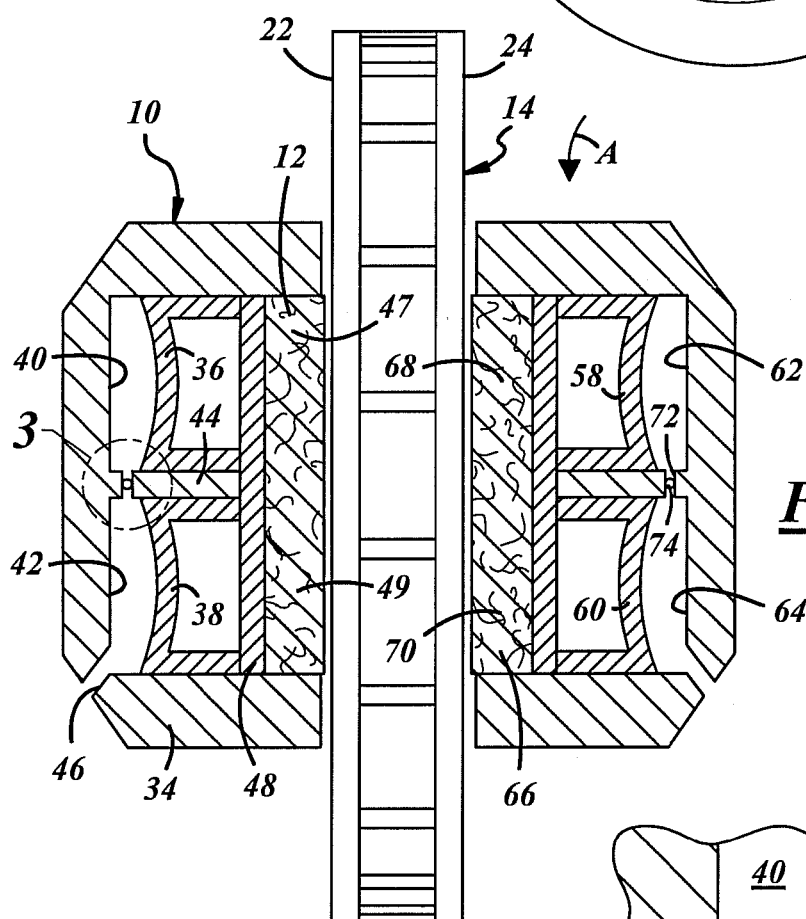
FIG. 2 is a sectional view taken along line 2-2 of FIG. 1.

The brake caliper 10 forces the brake pad 12 against the rotor 14. Referring to FIG. 2 and taking one side as an example, in this embodiment, the brake caliper 10 may include a housing 34, a first piston 36, and a second piston 38, and the brake pad 12. The housing 34 may have a first chamber 40 for receiving the first piston 36, and may have a second chamber 42 for receiving the second piston 38. A partition wall 44 of the housing 34 may extend between the first and second chambers 40, 42 to structurally separate the first and second chambers. A fluid inlet 46 may communicate with and may receive fluid from an inlet fluid line (not shown). The fluid inlet 46 may lead to the second chamber 42. The housing 34 may also include a backing plate 48. The housing 34 may have more, less, and/or different components than those shown and described.

Still referring to FIG. 2, the first piston 36 and the second piston 38 reciprocate in the first chamber 40 and the second chamber 42, respectively. The brake pad 12 may be mounted to the backing plate 48. The brake pad 12 may have a leading end portion 47 that is acted upon by the first piston 36, and may have a trailing end portion 49 that is acted upon by the second piston 38.

Figure 3:
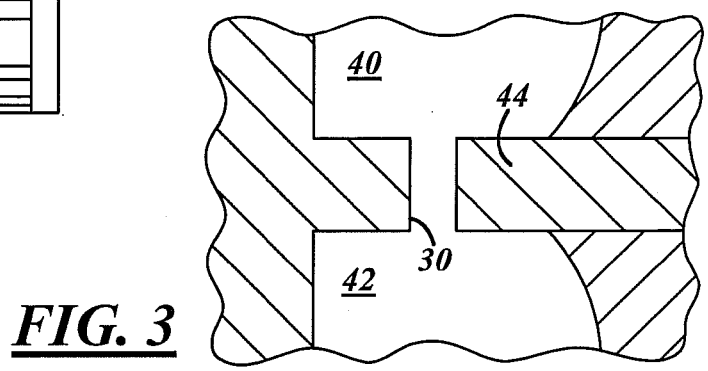
FIG. 3 is an enlarged view of the brake caliper of FIG. 2, showing an exemplary embodiment of a fluid passage.
Figure 5:
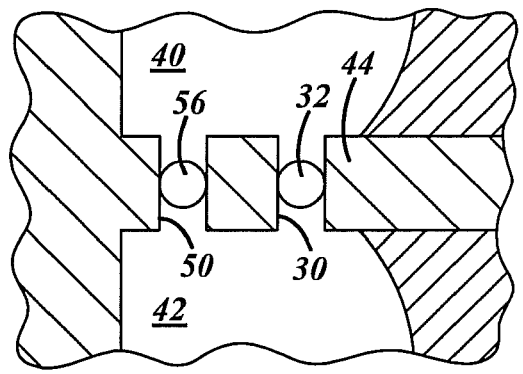
FIG. 5 is an enlarged view similar to FIG. 3, showing exemplary embodiments of a pair of valves.
Figure 6:
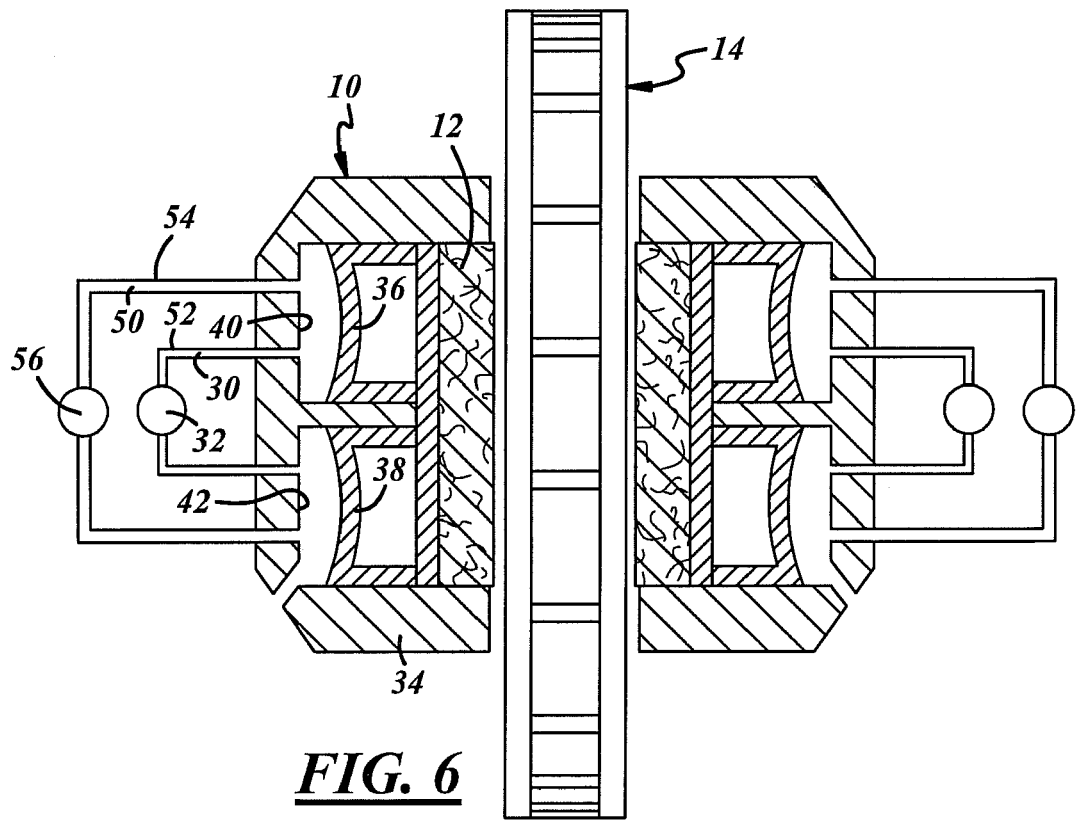
FIG. 6 is a sectional view similar to FIG. 2, showing other exemplary embodiments of a brake caliper and a rotor.

The fluid passage 30 may communicate with and may lead to the first chamber 40. The fluid passage 30 may extend between the first and second chambers 40, 42 and may communicate the chambers. Referring to FIG. 3, in one embodiment, the fluid passage 30 may be located inside of the housing 34 and may be defined in the partition wall 44. Referring to FIG. 5, in another embodiment, a second fluid passage 50 may also be located inside of the housing 34 and may also be defined in the partition wall 44. Like the fluid passage 30, the second fluid passage 50 may extend between the first and second chambers 40, 42 and may communicate the chambers. Referring to FIG. 6, and in yet another embodiment, the fluid passage 30 may be located outside of the housing 34 and may be defined by a single fluid line 52. The fluid line 52 may be a metal conduit that extends through the housing 34 at its ends and routes outside of the housing therebetween. The fluid line 52 may extend between the first and second chambers 40, 42 and may communicate the chambers. In another embodiment, the second fluid passage 50 may be provided and may be defined by a second fluid line 54.

The fluid passage 30 may have other configurations and arrangements not shown and described. For example, the fluid passage 30 could be located inside of the housing 34 but not necessarily in the partition wall 44, and instead could be routed through the housing at another location. As another example, the fluid passage 30 need not necessarily communicate the first and second chambers 40, 42, and instead could be defined by an inlet fluid line leading to the first chamber. And in some cases, the fluid passage 30 may merely receive and hold the valve 32, where fluid does not physically flow through the fluid passage.

In one embodiment, the fluid passage 30 may regulate and restrict fluid-flow to the first chamber 40 without the use of the valve 32. Referring to FIG. 3, fluid may flow into and pressurize the second chamber 42, through the fluid passage 30, and then may flow into and pressurize the first chamber 40. The fluid passage 30 may be dimensioned to delay pressurization of the first chamber 40, as compared to the pressurization of the second chamber 42. In one example, the fluid passage 30 may include multiple holes defined in the partition wall 44 or defined in a separate structure fixed in the partition wall. The small diameter holes restrict flow to the first chamber 40. The exact diameter of the fluid passage 30, including the multiple holes, may be dependent upon the desired fluid-flow restriction rate to the first chamber 40.

Figure 4:
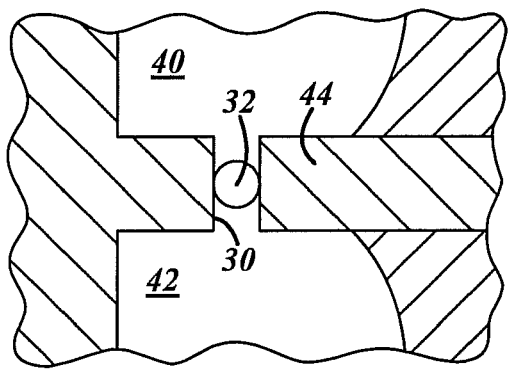
FIG. 4 is an enlarged view similar to FIG. 3, showing an exemplary embodiment of a valve.

The valve 32 may be located in the fluid passage 30 and may regulate the fluid-flow flowing into the first chamber 40. Referring to FIG. 4, the valve 32 may be located inside of the housing 34 and in the partition wall 44. Here, the valve 32 may be placed in the housing 34 by a cast-in-place process, may be press-fit and sealed in the partition wall 44, or may be placed in the housing by another suitable way. Referring to FIG. 5, in one embodiment a second valve 56 may also be located inside of the housing 34 and in the partition wall 44, and next to the valve 32. Referring to FIG. 6, in another embodiment the valve 32 may be located outside of the housing 34 and in the fluid line 52. Here, the valve 32 intersects fluid-flow flowing through the fluid line 52. Furthermore, the second valve 56 may be located outside of the housing 34 and in the second fluid line 54.

In select embodiments, the valve 32 may come in various types. The exact type of valve used and the specifications of the valve may be dictated by, among other things, the generated brake squeal, the particular caliper design, the dimensions of the brake pad, the friction material used for the brake pad, the rotor diameter, and the thickness of the cheek portion. For example, the valve 32 may be a check valve that allows fluid-flow in only one direction—in some cases, into or out of the first chamber 40. In different embodiments, the check valve may be pre-set to allow fluid-flow therethrough from about 200 kPa to about 5,000 kPa; of course, other values above and below this range may be possible. As another example, the valve 32 may be a proportioning valve that distributes different pressures to the first and second chambers 40, 42. The proportioning valve may distribute a first pressure to the first chamber 40 that is lesser in value than a second pressure distributed to the second chamber 42. As yet another example, the valve 32 may be an orifice valve that restricts, or slows, fluid-flow traveling therethrough. For instance, the orifice valve may restrict fluid-flow to the first chamber 40.

As mentioned, another set of dual-chambers and pistons may be located on an opposite side of the rotor 14. Referring to FIG. 2, a third piston 58 and a fourth piston 60 may respectively reciprocate in a third chamber 62 and a fourth chamber 64. A second brake pad 66 may have a second leading end portion 68 and may have a second trailing end portion 70. A second fluid passage 72 may lead to the third chamber 62, and a third valve 74 may be located in the second fluid passage. These components may be similar to those already described, so a detailed description will not be repeated here. In the embodiment of FIG. 6, a third and fourth fluid line are shown extending between a third and fourth chamber. In yet another embodiment, the first and second fluid lines 52, 54 may also extend and communicate with the third and fourth chambers.

In use, the brake caliper 10 may reduce or eliminate brake squeal by causing the trailing end portion 49 to contact the rotor 14 just before the leading end portion 47 contacts the rotor. This may also help even-out wear on the brake pad 12 over the life of the brake pad. In a sense, the pressure and thus the force may be biased in one way or another to the second chamber 42 and to the second piston 38, which in turn acts on the trailing end portion 49. The associated braking system may be a hydraulic system, a pneumatic system, or an electro-hydraulic system, for example. Thus the brake caliper 10 may handle a fluid such as a liquid or a gas.

When a vehicle operator applies the brake, the caliper 10 activates and forces the brake pad 12 against the rotor 14. In one embodiment, fluid may flow through the fluid inlet 46 and into the second chamber 42 to pressurize the second chamber. The fluid may then flow through the valve 32 and into the first chamber 40 to pressurize the first chamber. In one embodiment, the second chamber 42 may become pressurized before the first chamber 40, and the second piston 38 may thus press on the brake pad 12 at the trailing end portion 49 before the first piston 36 presses on the brake pad at the leading end portion 47. For example, in the case of the check valve, once the pressure at an inlet port of the valve 32 exceeds its specified pressure setting, the valve opens and fluid flows freely into the second chamber 42. In another embodiment, the first and second chambers 40, 42 may be pressurized concurrently but at different pressures and forces, whereby the second piston 38 presses against the trailing end portion 49 at a greater force than the first piston 36 presses against the leading end portion 47.

In any of the above-described embodiments, a relief valve and/or relief passage may be located at and may communicate with the first chamber 40, the second chamber 42, or both chambers. The relief valve and/or passage may be used to release pressure and equalize pressure of the first chamber 40, the second chamber 42, or both chambers. For example, in the embodiment shown in FIG. 5, the first valve 32 may be a one-way check valve permitting fluid-flow into the first chamber while the second valve 56 may be a one-way check valve permitting fluid-flow out of the first chamber. In another example, the relief valve and/or passage need not be located in the partition wall 44 and instead may be located in an outer wall of the first chamber 40, the second chamber 42, or both chambers.

The above description of embodiments of the invention is merely exemplary in nature and, thus, variations thereof are not to be regarded as a departure from the spirit and scope of the invention.

What is claimed is:

1. A product comprising:
  a brake caliper comprising a housing with a first chamber and a second chamber, comprising a first piston moving in response to fluid pressure in the first chamber and comprising a second piston moving in response to fluid pressure in the second chamber, the brake caliper also comprising a brake pad with a leading end portion acted upon by the first piston and with a trailing end portion acted upon by the second piston;
  a fluid passage leading to the first chamber; and
  a valve located in the fluid passage and regulating fluid-flow to the first chamber so that the trailing end portion contacts a rotor before the leading end portion contacts the rotor
  wherein the fluid passage is defined by a fluid line located outside of the housing and extending between the first and second chambers, and the valve is located outside of the housing.

2. A product as set forth in claim 1 further comprising:
  a third and a fourth chamber located in the housing;
  a third piston moving in response to fluid pressure in the third chamber, and a fourth piston moving in response to fluid pressure in the fourth chamber;
  a second brake pad located in the housing and having a second leading end portion acted upon by the third piston and having a second trailing end portion acted upon by the fourth piston;
  a second fluid passage leading to the third chamber; and
  a second valve located in the second fluid passage and regulating fluid-flow to the third chamber so that the second trailing end portion contacts the rotor before the second leading end portion contacts the rotor.

3. A product as set forth in claim 1 further comprising:
  a second fluid passage leading to the first chamber; and
  a second valve located in the second fluid passage and regulating fluid-flow to the first chamber so that the trailing end portion contacts the rotor before the leading end portion contacts the rotor.

4. A product as set forth in claim 1 further comprising a fluid inlet leading to the second chamber, and wherein fluid-flow flows through the fluid inlet, into the second chamber, into the fluid passage, through the valve, and into the first chamber.

5. A product as set forth in claim 1 wherein the valve is a check valve.

6. A product as set forth in claim 1 wherein the valve is a proportioning valve.

7. A product as set forth in claim 1 wherein the valve is an orifice valve.

8. A product as set forth in claim 1 wherein the second piston acts on the brake pad before the first piston acts on the brake pad.

9. A product comprising:
  a brake caliper comprising a housing with a first chamber, a second chamber, and a fluid inlet leading to the second chamber, comprising a first piston moving in response to fluid pressure in the first chamber and comprising a second piston moving in response to fluid pressure in the second chamber, the brake caliper also comprising a brake pad with a leading end portion acted upon by the first piston and with a trailing end portion acted upon by the second piston; and
  a fluid passage extending between the first and second chambers;
  the brake caliper being constructed and arranged so that when the brake caliper is activated fluid-flow flows through the fluid inlet, into the second chamber, through the fluid passage, and into the first chamber so that the trailing end portion contacts a rotor before the leading end portion contacts the rotor, wherein the first chamber receives fluid-flow to generate fluid pressure in the first chamber via only the fluid passage, wherein the valve is a check valve or proportioning valve.

10. A product as set forth in claim 9 further comprising a valve located in the fluid passage and regulating fluid-flow to the first chamber.

11. A product as set forth in claim 10 wherein the fluid passage is defined by a fluid line located outside of the housing and the valve is located outside of the housing.

12. A product as set forth in claim 10 wherein the valve is an orifice valve.

13. A product as set forth in claim 9 wherein, upon activation, the second piston acts on the brake pad before the first piston acts on the brake pad.

14. A product as set forth in claim 9 wherein the housing has a partition wall extending between the first and second chambers, and the fluid passage is defined in the partition wall.

15. A method comprising:
  providing a brake caliper having a housing with a first chamber and a second chamber, having a first piston moving in response to fluid pressure in the first chamber and having a second piston moving in response to fluid pressure in the second chamber, a fluid passage extending between the first and second chambers, a check valve located in the fluid passage, the brake caliper also having a brake pad with a leading end portion acted upon by the first piston and with a trailing end portion acted upon by the second piston;
  pressurizing the first and second chambers; and
  regulating pressure to the first chamber via the check valve so that the trailing end portion contacts a rotor before the leading end portion contacts the rotor.

16. A product comprising:
  a brake caliper comprising a housing with a first chamber, a second chamber, and a fluid inlet leading to the second chamber, comprising a first piston moving in response to fluid pressure in the first chamber and comprising a second piston moving in response to fluid pressure in the second chamber, the brake caliper also comprising a brake pad with a leading end portion acted upon by the first piston and with a trailing end portion acted upon by the second piston; and a fluid passage extending between the first and second chambers;

the brake caliper being constructed and arranged so that when the brake caliper is activated fluid-flow flows through the fluid inlet, into the second chamber, through the fluid passage, and into the first chamber so that the trailing end portion contacts a rotor before the leading end portion contacts the rotor, wherein the first chamber receives fluid-flow to generate fluid pressure in the first chamber via only the fluid passage, further comprising a valve located in the fluid passage and regulating fluid-flow to the first chamber, wherein the fluid passage is defined by a fluid line located outside of the housing and the valve is located outside of the housing.

* * * * *